US010339544B2

United States Patent
Klima et al.

(10) Patent No.: US 10,339,544 B2
(45) Date of Patent: Jul. 2, 2019

(54) TECHNIQUES FOR AUTOMATIC REAL-TIME CALCULATION OF USER WAIT TIMES

(71) Applicant: WaitTime, LLC, Detroit, MI (US)

(72) Inventors: Zachary Klima, Ferndale, MI (US); Thomas Sterling, South Lyon, MI (US); John Mars, Jr., Auburn Hills, MI (US); Doyle Mosher, Birmingham, MI (US)

(73) Assignee: WAITTIME, LLC, Detroit, MI (US)

( * ) Notice: Subject to any disclaimer, the term of this patent is extended or adjusted under 35 U.S.C. 154(b) by 761 days.

(21) Appl. No.: 14/789,320

(22) Filed: Jul. 1, 2015

(65) Prior Publication Data

US 2016/0005053 A1 Jan. 7, 2016

Related U.S. Application Data

(60) Provisional application No. 62/019,940, filed on Jul. 2, 2014.

(51) Int. Cl.
*G06Q 30/02* (2012.01)
*G06T 5/00* (2006.01)
(Continued)

(52) U.S. Cl.
CPC ......... *G06Q 30/0201* (2013.01); *G06Q 10/06* (2013.01); *G06Q 10/10* (2013.01);
(Continued)

(58) Field of Classification Search
CPC .... G06Q 30/0201; G06Q 10/06; G06Q 10/10; G06T 7/13; G06T 5/002; G06T 11/60; G07C 11/00; G07C 2011/04; H04N 7/18
See application file for complete search history.

(56) References Cited

U.S. PATENT DOCUMENTS 5,097,328 A * 3/1992 Boyette .................. G06Q 10/06
348/150
5,953,055 A * 9/1999 Huang ............... G06K 9/00228
348/149

(Continued)

FOREIGN PATENT DOCUMENTS

AU 2015283940 A1 * 2/2017 ......... G06Q 30/0201
EP 2093698 A1 8/2009
(Continued)

OTHER PUBLICATIONS

InnovationQ NPL Search_U.S. Appl. No. 14/789,320, Feb. 11, 2019.*

(Continued)

*Primary Examiner* — Tyler W Knox
(74) *Attorney, Agent, or Firm* — RMCK Law Group, PLC

(57) ABSTRACT

A computer-implemented technique can process overhead images of users in a line at a venue to obtain a user wait time for the line. The processing can include (a) identifying a user of the group of users that is second in the line to obtain a target user, (b) detecting when the target user becomes first in the line to obtain a start time, (c) after the target user becomes first in the line, detecting when the target user leaves the line to obtain an end time, (d) determining a period from the start time to the end time, and (e) calculating the user wait time by calculating a product of (i) the determined period and (ii) a quantity of the group of users in the line after the target user leaves the line. The calculated user wait time can then be output.

17 Claims, 5 Drawing Sheets

(51) Int. Cl.
*G06T 11/60* (2006.01)
*H04N 7/18* (2006.01)
*G06Q 10/06* (2012.01)
*G06Q 10/10* (2012.01)
*G07C 11/00* (2006.01)

(52) U.S. Cl.
CPC .............. *G06T 5/002* (2013.01); *G06T 11/60* (2013.01); *G07C 11/00* (2013.01); *H04N 7/18* (2013.01); *G07C 2011/04* (2013.01)

(56) References Cited

U.S. PATENT DOCUMENTS

| | | | | |
|---|---|---|---|---|
| 7,224,382 | B2* | 5/2007 | Baker | H04N 5/2259 348/46 |
| 8,010,402 | B1* | 8/2011 | Sharma | G06Q 10/00 705/14.49 |
| 9,124,778 | B1* | 9/2015 | Crabtree | H04N 7/18 |
| 9,299,084 | B2* | 3/2016 | Argue | G06Q 30/0201 |
| 9,679,200 | B2* | 6/2017 | Schlattmann | G06T 7/20 |
| 2002/0167408 | A1* | 11/2002 | Trajkovic | G06Q 30/06 340/573.1 |
| 2003/0036936 | A1* | 2/2003 | Steichen | G06Q 10/0639 705/7.38 |
| 2003/0049027 | A1* | 3/2003 | Umeda | G03B 13/18 396/89 |
| 2004/0260513 | A1* | 12/2004 | Fitzpatrick | G06Q 10/06 702/182 |
| 2005/0062869 | A1* | 3/2005 | Zimmermann | G02B 13/06 348/335 |
| 2005/0154560 | A1* | 7/2005 | Fitzpatrick | G06Q 10/06 702/182 |
| 2007/0182818 | A1* | 8/2007 | Buehler | G08B 13/19602 348/143 |
| 2007/0253595 | A1* | 11/2007 | Sorensen | G07C 9/00 382/103 |
| 2008/0312871 | A1* | 12/2008 | Salcedo | G05B 15/02 702/179 |
| 2008/0316327 | A1* | 12/2008 | Steinberg | G06K 9/00248 348/222.1 |
| 2009/0034797 | A1* | 2/2009 | Senior | G06K 9/00771 382/104 |
| 2009/0106051 | A1* | 4/2009 | Albro | G06Q 10/06 705/3 |
| 2009/0202114 | A1* | 8/2009 | Morin | A63F 13/12 382/118 |
| 2010/0033552 | A1* | 2/2010 | Ogawa | H04N 1/3873 348/36 |
| 2010/0117790 | A1* | 5/2010 | Bayne | G07C 9/00111 340/5.21 |
| 2010/0277276 | A1* | 11/2010 | Bayne | G07C 9/00111 340/5.21 |
| 2010/0322516 | A1* | 12/2010 | Xu | G06K 9/00778 382/173 |
| 2011/0029333 | A1* | 2/2011 | Zytman | G06Q 10/02 705/5 |
| 2011/0292236 | A1* | 12/2011 | Shiohara | G06T 1/00 348/222.1 |
| 2012/0113299 | A1* | 5/2012 | Palik | G06T 5/50 348/241 |
| 2012/0179742 | A1* | 7/2012 | Acharya | H04N 7/18 709/202 |
| 2013/0027561 | A1* | 1/2013 | Lee | G06Q 30/02 348/150 |
| 2013/0117695 | A1* | 5/2013 | Hammoud | G06Q 30/00 715/761 |
| 2013/0223678 | A1* | 8/2013 | Brunetti | G06K 9/00778 382/103 |
| 2014/0163934 | A1* | 6/2014 | Zhang | G06Q 10/06 703/2 |
| 2014/0258061 | A1* | 9/2014 | Calman | G06Q 40/00 705/35 |
| 2014/0286628 | A1* | 9/2014 | Ando | H04N 9/793 386/282 |
| 2014/0300644 | A1* | 10/2014 | Gillard | G06T 15/20 345/660 |
| 2015/0095107 | A1* | 4/2015 | Matsumoto | G06Q 30/02 705/7.29 |
| 2015/0169954 | A1* | 6/2015 | Schlattmann | G06T 7/20 382/103 |
| 2015/0193997 | A1* | 7/2015 | Butler | G07C 11/00 340/5.6 |
| 2015/0310458 | A1* | 10/2015 | Bernal | G06Q 30/0201 382/103 |

FOREIGN PATENT DOCUMENTS

| | | | | |
|---|---|---|---|---|
| JP | | 2004348618 A | * 12/2004 | |
| WO | WO-2006011804 A1 | * | 2/2006 | ....... G08B 13/19602 |
| WO | | 2007030168 A1 | 3/2007 | |

OTHER PUBLICATIONS

ProQuest Dialog NPL Search_U.S. Appl. No. 14/789,320, Feb. 11, 2019.*
Google Scholar NPL Search U.S. Appl. No. 14/789,320, Feb. 11, 2019.*
International Search Report and Written Opinion for International Application No. PCT/US2015/038985 dated Sep. 18, 2015, 11 pages.

* cited by examiner

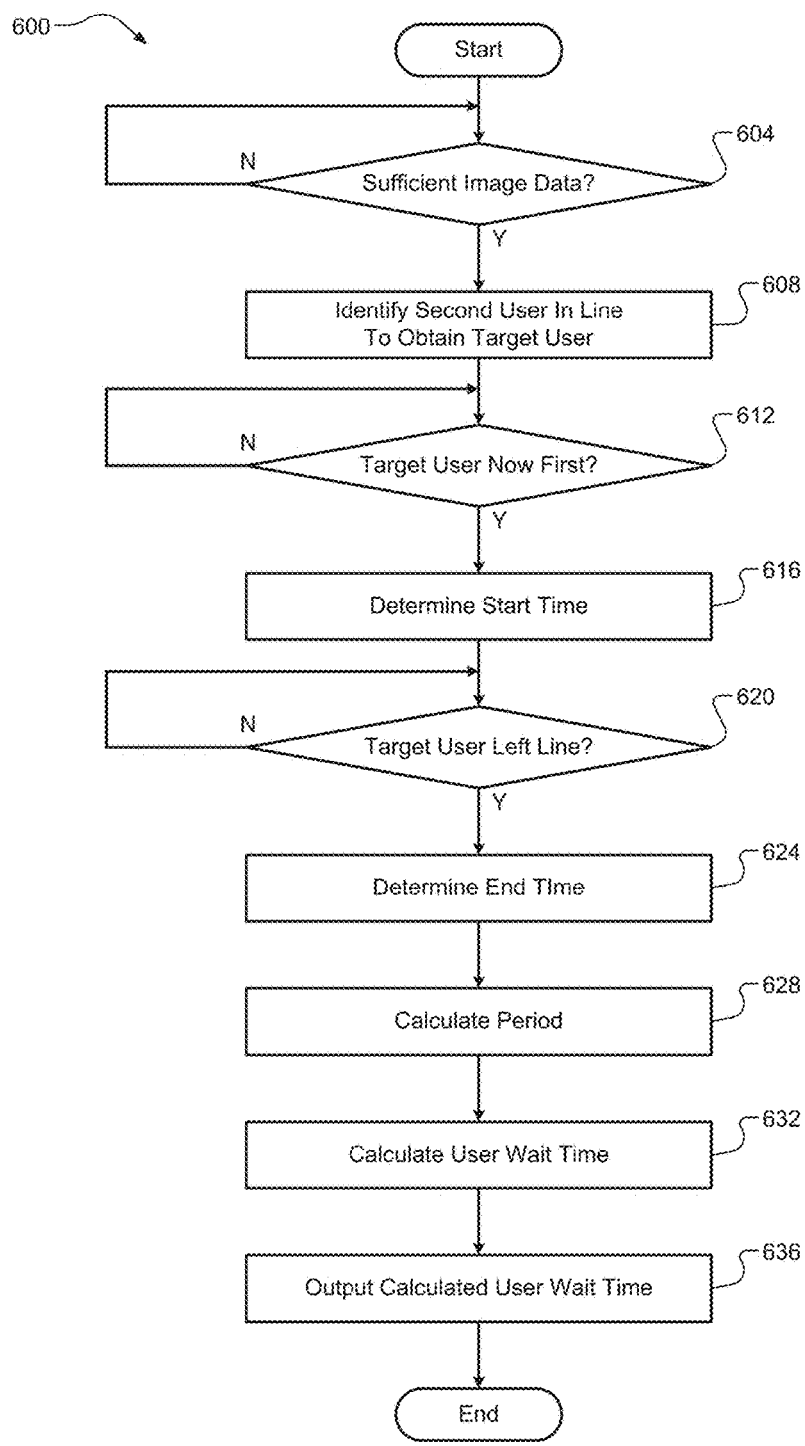

TECHNIQUES FOR AUTOMATIC REAL-TIME CALCULATION OF USER WAIT TIMES

CROSS-REFERENCE TO RELATED APPLICATION

This application claims the benefit of U.S. Provisional Application No. 62/019,940, filed on Jul. 2, 2014. The disclosures of the above applications are incorporated herein by reference in their entirety.

FIELD

The present disclosure relates generally to computer systems and, more particularly, to techniques for automatic, real-time calculation of user wait times.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

FIG. 1 illustrates an example of a group of users 100-1 . . . 100-N (N>1; collectively "users 100") waiting in a line 104 at a venue. Each user 100 may not know the wait time to progress to a front 108 of the line 104. The front 108 of the line 104 can correspond to a final or goal destination 112 (e.g., a door) for each of the users 100. More particularly, a last user 100-N that is currently at an end 116 of the line 104 may not know how long a front user 100-1 has been waiting in the line 104. Because the users 100 are typically strangers, a specific user 100 may be unwilling or uncomfortable asking another of the users 100 how long they have been waiting in the line 104. Additionally, because wait times fluctuate, a specific user 100 may prefer to wait in the line at a different time with a shorter wait time. Without knowing the approximate wait time, however, each user 100 is forced to wait in the line 104. Thus, there remains a need for improvement in the art of calculating user wait times.

SUMMARY

A computer-implemented technique is presented. The technique can include receiving, at a computing system from an overhead camera system, the computing system having one or more processors, overhead images of a group of users in a line at a venue. The technique can include in response to receiving the overhead images, processing, at the computing system, the overhead images to obtain a user wait time for the line, the processing including: (a) identifying a user of the group of users that is second in the line to obtain a target user, (b) detecting when the target user becomes first in the line to obtain a start time, (c) after the target user becomes first in the line, detecting when the target user leaves the line to obtain an end time, (d) determining a period from the start time to the end time, and (e) calculating the user wait time by calculating a product of (i) the determined period and (ii) a quantity of the group of users in the line after the target user leaves the line. The technique can also include outputting, from the computing system, the calculated user wait time.

An automatic, real-time user wait time calculation system is also presented. The system can include an overhead camera system comprising at least one overhead camera configured to capture overhead images of a group of users in a line at a venue. The system can also include a computing system in communication with the overhead camera system and configured to: (a) identify a user of the group of users that is second in the line to obtain a target user, (b) detect when the target user becomes first in the line to obtain a start time, (c) after the target user becomes first in the line, detect when the target user leaves the line to obtain an end time, (d) determine a period from the start time to the end time, (e) calculate the user wait time by calculating a product of (i) the determined period and (ii) a quantity of the group of users in the line after the target user leaves the line, and (f) output the calculated user wait time (collectively "the technique").

In some implementations, the overhead camera system includes at least one overhead camera (i) mounted to a ceiling in an area above the line and (ii) configured to capture the overhead images. In some implementations, each overhead camera has approximately a ninety-degree viewable area.

In some implementations, the technique further includes combining two or more of the overhead images to obtain a combined overhead image and processing the combined overhead image to obtain the user wait time for the line. In some implementations, the technique further includes adjusting, by the computing system, at least one of the two or more overhead images to correct for edge distortion before or during the combining.

In some implementations, the technique further includes ignoring or disregarding a specific target user in calculating the user wait time based on a movement speed of the specific target user. In some implementations, the specific target user is ignored or disregarded when their movement speed is greater than a speed threshold indicative of a high likelihood that the specific target user is not waiting in the line.

In some implementations, outputting the user wait time includes outputting the user wait time to at least one of (i) a mobile computing device in response to a user request from the mobile computing device and (ii) a remote computing system associated with a mobile application executable by mobile computing devices.

In some implementations, the line is for one of (i) an entrance to the venue, (ii) an exit from the venue, (iii) a restroom at the venue, and (iv) a concession station at the venue. In some implementations, the venue is one of (i) an arena or stadium for a sporting or music event, (ii) a theme or amusement park, and (iii) a business or retail location.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 illustrates a flow diagram of an example technique for automatic, real-time calculation of user wait times according to some implementations of the present disclosure.

DETAILED DESCRIPTION

Figure 1:
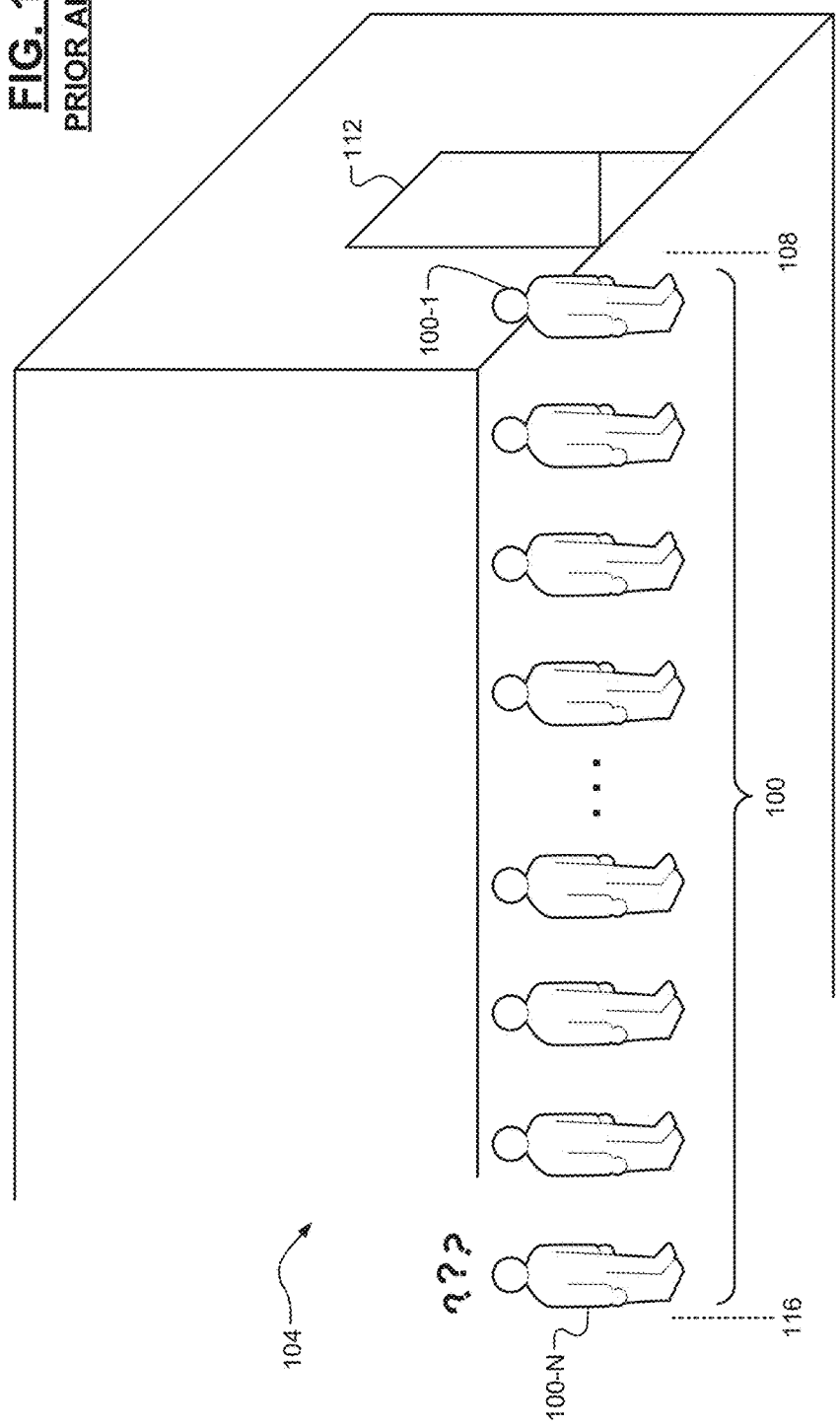
FIG. 1 illustrates a diagram of a user waiting in line according to the prior art.

As previously discussed, there remains a need for improvement in the art of calculating user wait times. More specifically, conventional systems do not provide user wait times in real-time. Accordingly, techniques are presented for automatic, real-time calculation of user wait times. The techniques can utilize an overhead camera system, such as one or more 90 degree viewable area (e.g., fish eye lens) cameras, to capture overhead image data of a group of users in a line at a venue. The term "venue" as used herein can refer to any suitable environment where a line of users may form. Examples of the venue include arenas and stadiums for sporting and music events. Similarly, examples of the lines include entrance/ingress lines, exit/egress lines, restroom lines, and concession lines. It should be appreciated, however, that the techniques are applicable to other suitable venues/lines, such as theme/amusement parks with lines for rides/attractions, business or retail venues with lines for restrooms, elevators, and/or purchasing, or even to vehicle traffic monitoring where the vehicles represent the users. In other words, the term "venue" represents any area where people queue into the "line," whether instructed to (e.g., by signage) or not instructed to (e.g., organically).

The overhead image data is provided to a computing system, which can be located either on-site at the venue or remote from the venue. The overhead image data can be provided to the computing system via any suitable wired or wireless communication medium. Utilizing on the overhead image data over a period of time, the computing system can identify one or more target users in the line, monitor movement of the target user(s), and calculate a user wait time for the line indicative of a time for a specific user to progress from an end of the line to a front of the line. The term "user wait time" as used herein can refer to a wait time for any human to progress through a particular line at a particular venue. In one implementation, the user wait time corresponds to a user of a mobile application or reporting service associated with the techniques of the present disclosure. The calculated user wait time can then be output by the computing system to various devices, such as a mobile computing device of a requesting user or another computing system.

In one exemplary implementation, the target user is identified as a person that is second from a front of the line (i.e., second in line). When the target user progresses to the front of the line (i.e., becomes first in line), a timer is started. When the target user leaves the line after becoming first in line, the timer is stopped. The value of the timer represents a period for the target user to have left the line after becoming first in line. This period can then be multiplied by a total number of users currently in the line to calculate the user wait time. This process can be continually repeated and the user wait time recalculated to provide an accurate, real-time user wait time for the line. Additionally, users can be filtered out (i.e., not counted as being in line) based on certain conditions. One example condition is the users being in the viewable area of one of the overhead cameras but moving at greater than a speed threshold indicative of the users merely walking nearby the line and not actually being in the line.

Figure 2:
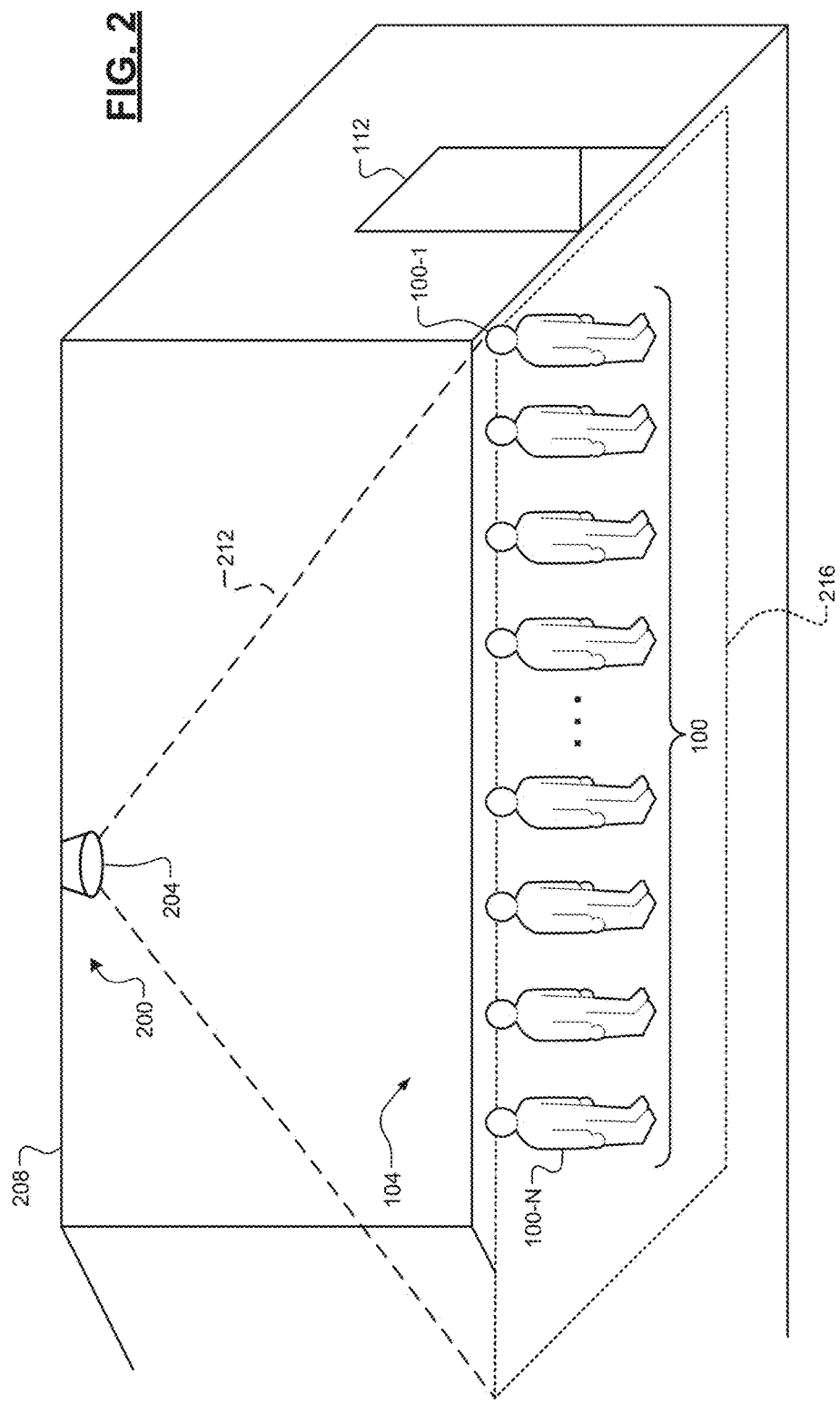
FIG. 2 illustrates a diagram of an example overhead camera system for a group of users in line according to some implementations of the present disclosure.

Referring now to FIG. 2, a diagram of an example overhead camera system 200 is illustrated according to some implementations of the present disclosure. The overhead camera system 200 is configured to capture overhead images of the group of users 100 in order to calculate user wait times in real-time. In one exemplary implementation, the overhead camera system 200 includes an overhead camera 204 having a 90 degree or approximately 90 degree viewable area. One example of the overhead camera 204 utilizes a fish eye lens. It should be appreciated, however, that the overhead camera system 200 could be any suitable overhead camera system configured to capture images that are adequate for calculating the user wait times, such as three-dimensional images. In some implementations, the overhead camera system 200 further includes on-board electronics, such as a field-programmable gate array (FPGA) (e.g., a military-grade FPGA) or other suitable integrated circuits configured to perform at least a portion of the image processing locally. In yet other implementations, the overhead camera system 200 is not mounted directly above an area, but rather on an angle. Such a configuration, for example, could be used for monitoring ingress/egress where specific numbers and movement monitoring of users is not desired, but instead a general increasing/decreasing mass or quantity of users is desired.

The overhead camera system 200 can be mounted to a suitable surface 208 at the venue. Examples of the surface 208 include an upper wall and a ceiling. The overhead camera system 200 can be mounted such that the overhead camera system 200 is aligned to capture overhead images of a desired area at the venue. For example only, the surface 208 could be a ceiling approximately 20 feet high, and the overhead camera system 200 can be configured to have a viewing/capture area of approximately 30 by 20 feet (~600 square feet). This desired area can correspond to an area where lines, such as the line 104, typically form. Examples of these areas are entrances, exits, restrooms, and concessions. Specifically, the overhead camera system 200 is mounted such that it is configured to capture overhead images with respect to a field of view 212. In one exemplary implementation, the overhead camera 204 is mounted directly overhead of the line 104 to obtain more accurate overhead images and thus better monitoring of the users 100 (e.g., their heads) as the users 100 progress in line.

The overhead camera system 200 can also use different frame rates for different mounting heights. More specifically, a higher frame rate (e.g., 1080 p) could be utilized when the mounting height is higher, whereas a lower frame rate (e.g., 720 p) could be utilized when the mounting height is lower. Lower frame rates could be ideal to decrease system throughput, thus saving time/resources, but a minimum frame rate may be necessary for the system to accurately monitor the area and accurately estimate the user wait times. Further, in some implementations, a portion of a higher resolution (e.g., 1080 p) image could be trimmed when not utilized in order to save on bandwidth/processing. The overhead camera system 200 can be configured to output compressed images, such as JPEG images, although any suitable compressed image could be utilized. In some implementations, the raw, uncompressed images could be output, e.g., when there are too many users in the viewing area and there are errors in the user wait time calculation. These compressed images can be output, via a wired or wireless connection, to an on-site (or off-site) central system. One example frame rate is 10 frames per second, although other suitable frame rates could be utilized. One example frame rate is a smallest frame rate that suffers zero loss or an acceptable loss of persons being monitored in the viewing area. By using a high enough frames per second, the proximity of each person can be assumed across images (e.g., it can be assumed that no person can move out of the viewing area in, for example, one tenth of a second).

The overhead images captured by the overhead camera system 200 can also be used to filter, ignore, or otherwise disregard a specific target user for purposes of the user wait time calculation. For example, there may be users 100 in the field of view 212 that are not actually in the line 104. In one exemplary implementation, the movement speed of the users 100 can be utilized to determine whether the users 100 are in the line 104 or not. For example, users 100 in the viewable area 212 that are moving at greater than a speed threshold can be filtered out or disregarded for the user wait time calculation. This speed threshold can be predetermined or learned by the system and can be indicative of a user movement speed having a high degree of likelihood that a specific target user is not in the line 104 (e.g., a few feet per second). Because the users 100 in the line 104 typically move rather slowly, this can be an effective technique for filtering out ones of the users 100 that are not in the line 104.

Figure 3:
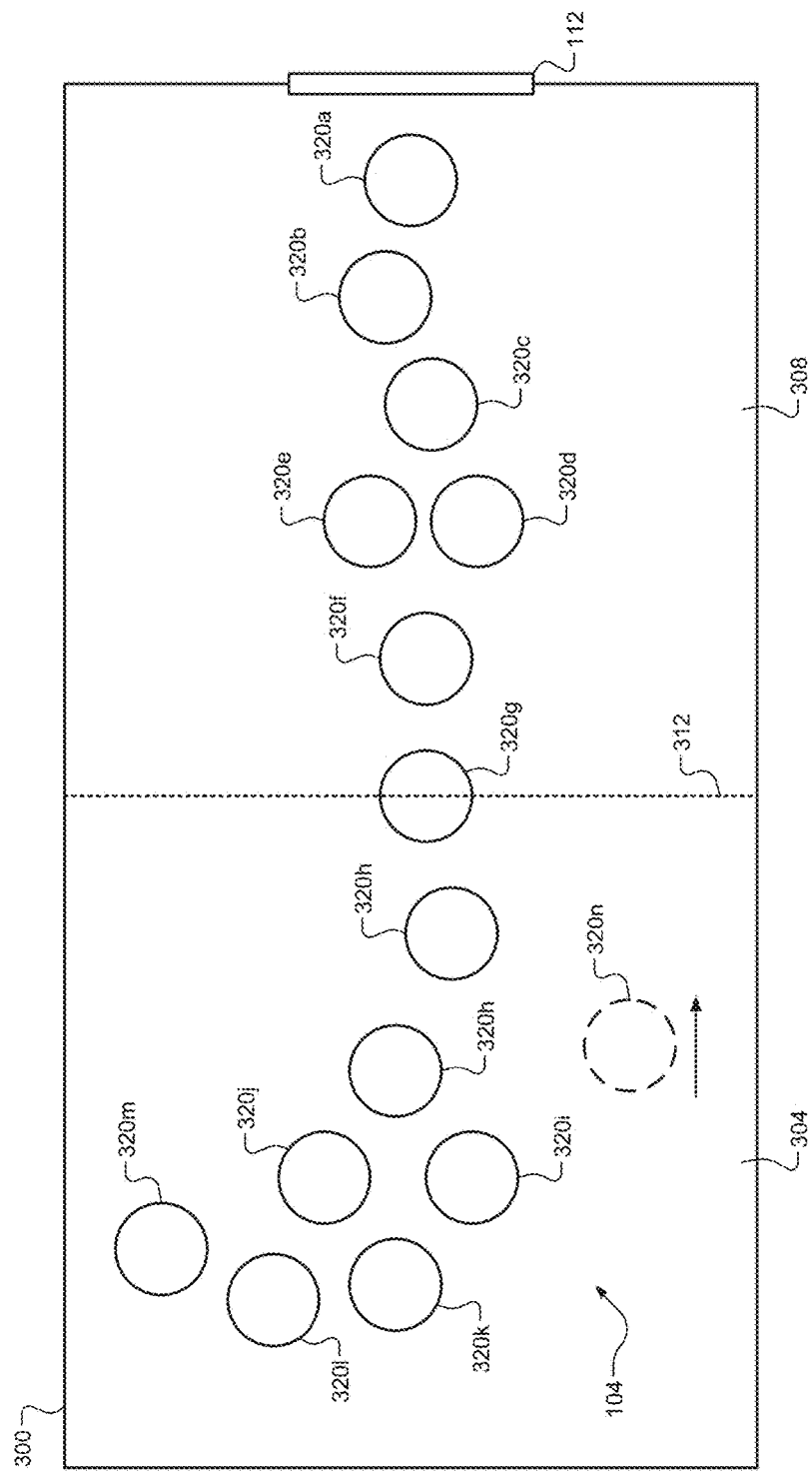
FIG. 3 illustrates an example overhead image a line of users according to some implementations of the present disclosure.

Referring now to FIG. 3, an example overhead image 300 of the line 104 is illustrated. In some implementations, the overhead image 300 can be obtained by stitching together two or more other images 304, 308. These other images 304 could be captured, for example, by two separate overhead camera systems 200 or two separate cameras of the overhead camera system 200. This stitching could include trimming overlapping portions. In the illustrated image 300, the images 304, 308 are stitched or combined along edge 312. In some cases, a user (e.g., user 320g) may be at least partially present in both images 304, 308. The stitching or combining procedure, therefore, could take this into account. In addition, edge correction could be performed on the image 300 or images 304, 308. Edge correction can involve adjusting the edges of the images 300 or 304, 308 to account for distortion caused by curvature of lenses (e.g., fish eye lenses) of the overhead camera system 200.

As shown, the line includes users 320a-320n (collectively "users 320"). While the line 104 could be generally straight, the line 104 could also curve as shown. For example, the line 104 could curve around an object such as a structural pole or a garbage can. This curvature can be accounted for in identifying which of the users 320 are actually in the line 104. The image 300 is illustrated with each of the users 320 being represented by a circle or point, which can be centered at the detected head and/or shoulders of each user 320. The image 300 could still include graphical representations of the actual overhead users 320, but the circles or points could be on or outlining the users 320. In some implementations, the system can utilize an x-y coordinate system for the image 300, and each of the users 320 can be located at a specific x-y coordinate or specific range or x-y coordinates, thus enabling the system to utilize a vector representation for monitoring the users 320. It should be appreciated that the tracking of users in the line or in the viewable area is solely for the purpose of wait time calculation. These users are not uniquely identified or otherwise monitored outside of this viewable area—only their movement within the viewable area is monitored for the purposes of wait time calculation.

As shown, some of the users 320 may be in the image 300 but not actually in the line 104. This determination can be made, for example, based on speed filtering of movement of the users 320. User 320n, for example, is proximate the line 104, but his or her movement speed is greater than a speed threshold, and thus it can be determined that he or she is merely walking proximate the line 104 but is not actually in the line 104. Thus, it can be determined that only users 320a-320m are in the line 104. Other determinations could also be utilized to determine whether or not each user 320 is actually in the line 104, such as proximity to other users 320. In some cases, two or more of the users 320 (e.g., users 320d and 320e) may be standing side-by-side in the line 104. This may not be an issue for calculating the total number of the users 320, but it could affect the determination of which of these two or more users 320 is next in the line 104. In these scenarios, the system can treat all of these side-by-side users 320 as a single user for each wait time calculation until the last of the side-by-side users 320 leaves the line 104.

As previously discussed, the user wait time can be calculated by identifying the second user in the line 104 (e.g., user 320b) and then determining a period from when the identified or target user becomes first in the line 104 (e.g., where user 320a used to be) until the identified or target user 320b leaves the line 104. This period can then be multiplied by the total number of the users 320 left in the line 104 (e.g., user 320c to 320m, or 11 users). For example, if this period was 30 seconds, the user wait time could be calculated as 30 seconds times 11 users, or 5 minutes and 30 seconds. By monitoring only the users 320 at the front of the line 104 (i.e., the second user 320b), the system is able to handle and is otherwise insulated from problems that could occur when a large number of users join the end of the line 104 in a short period of time, which would otherwise affect a user wait time calculation when monitoring the entire line or when monitoring the last user's progression from the end of the line to the front of the line.

Various filters may be implemented in order to further distinguish humans from noise (lights, inanimate objects, etc.). For example, bright lights and reflective surfaces may be inadvertently detected as humans if not accounted for. One example filter is an edge detection filter that detects only the edges of objects and filters out other features. In some implementations, both spatial and temporal polychromatic edge filters are implemented. In such implementations, the areas with the strongest edges are sorted to identify the highest probability fit for their positions. Detected edges can then be used to distinguish between humans and inanimate objects (trash cans, tables, chairs, signs, etc.). Another example filter is a delay filter that introduces a delay before illustrating the video feed (e.g., to the venue) in order to be able to account for brief monitoring errors, such as when two users cross paths. By introducing this delay, the brief errors can be quickly corrected and the viewer of the video feed is unaware. For example only, this delay could be a half second or approximately five frames.

Another example filter is a debug filter than can monitor (and potentially display) parameters for each of the users 320. Examples of the parameters include a unique identifier, a height/weight ratio (indicative of motion strength), a current motion strength, a positional/movement indicator, an age (duration that the particular user 320 has been tagged), and a static weight. The debug filter can also implement some artificial intelligence by predicting a specific user's future linear path of movement based on their past and current paths of movement. By being able to predict each user's path of movement, monitoring errors (e.g., losing track of a user) can be decreased or eliminated. Using this information, the system is also potentially able to anticipate issues (e.g., users crossing paths) and/or adjust itself (e.g., wait time prediction) based on the user's predicted path of movement (e.g., out and away from the line).

Figure 4:
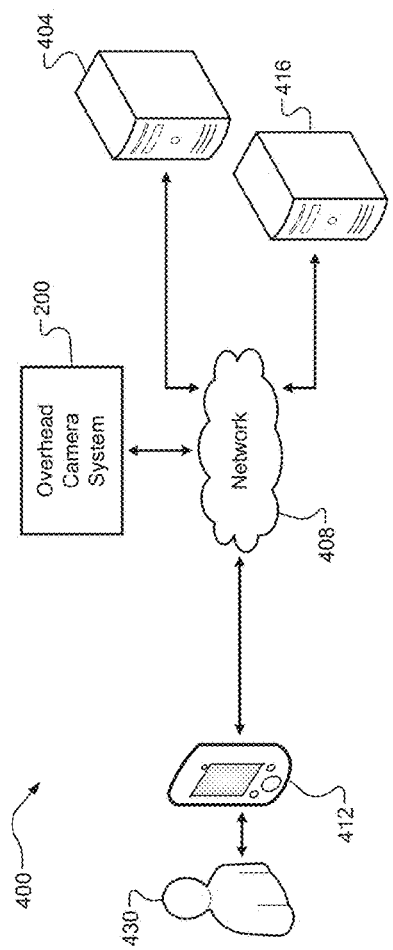
FIG. 4 illustrates a partial schematic diagram of an example computing system including the overhead camera system of FIG. 2 and further including an example computing system and an example mobile computing device according to some implementations of the present disclosure.
Figure 5:
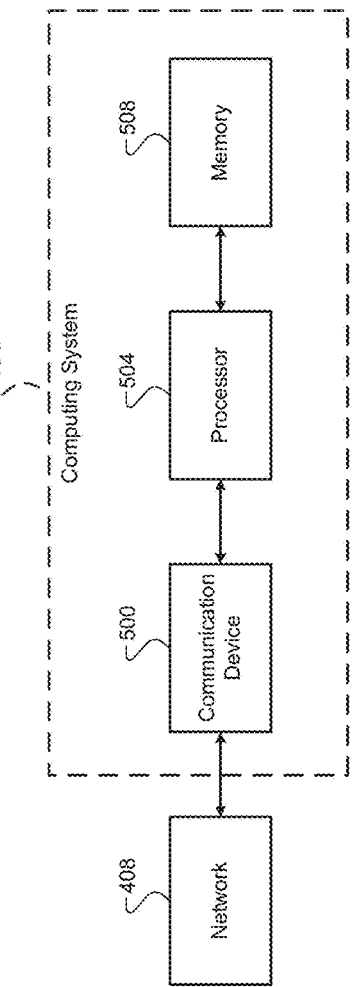
FIG. 5 illustrates a functional block diagram of the example computing system of FIG. 4.

Referring now to FIG. 4, a partial schematic diagram of an example computing network 400 including the overhead camera system 200 is illustrated. The overhead camera system 200 can communicate with a computing system 404 via a network 408. The term "computing system" as used herein can refer to any suitable computer or computers operating in a parallel or distributed architecture. Examples of the computers can include servers, either located remotely or on-site at the venue. A mobile computing device 412 can also communicate with the server 404 via the network 408. The network 408 can include a local area network (LAN), a wide area network (WAN), e.g., the Internet, or a combination thereof. The network 408 can include wired communication mediums (e.g., a Cat 5 Ethernet cable) and/or wireless communication mediums (e.g., WiFi, WiFi Direct, or BLUETOOTH). Examples of the mobile computing device 412 include a laptop computer, a tablet computer, and a mobile phone, but other suitable devices such as a desktop computer could be used. In some implementations, the computing system 404 can also communicate via the network 408 with another computing system 416, such as a mobile application server, a web server, or a cumulative data gathering and analytics server.

While one overhead camera system 200 is shown, it should be appreciated that the computing network 400 can include a plurality of overhead camera systems 200. For example, one overhead camera system 200 may be mounted at every potential area in the venue that could have significant lines. Each overhead camera system 200 is configured to transmit overhead images to the computing system 404 via the network 408. While the transmission of overhead images is discussed herein, the overhead camera system 200 could also provide a video feed to the computing system 404. The overhead images are over a period of time, which could be a few seconds or a few minutes. Based on these overhead images, the computing system 404 is configured to process and calculate a user wait time for the lines associated with the areas corresponding to the overhead camera systems 200. The computing system 404 can output the calculated wait time to the mobile computing device 412, such as in response to a user request at the mobile computing device 412 from the user 420. For example, the user 420 may be sitting in their seat at the venue and may be interested in the current wait times for a particular location (restroom, concessions, etc.). In one implementation, the mobile computing device 412 may be executing a mobile application associated with the computing system 404 and the overhead camera system(s) 200. In some implementations, the overhead image(s) can be accessed at the mobile computing device 412, similar to a live stream of the line 104.

Additionally or alternatively, the computing system 404 can output the calculated wait time to the other computing system(s) 416. In one implementation, the other computing system 416 is a web server and the calculated wait time could be posted on a web page hosted by the other computing system 416. For example, the web page may be associated with the venue. In another implementation, the other computing system 416 is a local computing device at the venue, such as an electronic sign or billboard and the calculated wait time could thus be displayed to a large quantity of users at the venue. In another implementation, the other computing system 416 is a mobile application server associated with an application program interface (API) that can be called upon by other devices, such as the mobile computing device 412.

By providing the wait times and other metrics to user mobile computing devices, there is a direct connection established with the users. Using this connection (e.g., an application on their mobile computing device), information, offers/discounts, and advertisements can be presented to the users. One example of such information is menus for concession stands. In one implementation, concession stands may generate an offer/discount that is provided to user mobile computing devices in relation to the wait time for that concession stand. For example, when the wait times are short, that concession stand may want to generate an offer/discount to draw users to their location. The users can then redeem the offer/discount by showing the offer/discount on their mobile computing device and/or by scanning a code (e.g., a quick response, or QR code) at the concession stand. Such an application on the mobile computing device could also be a universal application that can be easily setup/configured by any venue (i.e., not venue-specific).

In yet another implementation, the other computing system 416 is a cumulative data gathering and analytics server. In this scenario, the other computing system 416 could gather a plurality of calculated wait times over a long period of time and analyze the gathered data to analyze metrics such as average wait times, areas of congestion, and the like. Other example real-time analytics that can be captured by the system include counts of users, serve time (e.g., for concessions), line attrition, pass-through traffic (e.g., a number of users passing through an area/location but not in the actual line), ingress/egress, and congregation traffic (e.g., a number of users congregating in the area/location but not in the actual line). For example only, the system may achieve counts of users with greater than 90% accuracy. These metrics could then be used by the venue and/or other venues to reorganize or restructure in the future in order to decrease wait times. These metrics could also be used by others, such as vendors of the concessions, as part of tracking sales trends, heat thermal mapping, strategic advertising campaigns, traffic trends, deal pushing times, line attrition, and the like.

As mentioned above, one example metric is user attrition (i.e., users leaving the line 104 before reaching the front of the line 104). Other metrics include spikes in or otherwise irregular user wait times, which could then be utilized by the venue to diagnose a potential problem, such as poor line area layout, insufficiently sized bathrooms, or slow service at concession stands. These metrics could also be used to provide suggestions to prospective users at the venue, such as "use a different bathroom than the one outside your section" or "buy a hot dog from a different hot dog stand than the one nearby you." Software updates could be periodically provided to the system from the software provider for download by the venue to their central system. In some implementations, the software provider could implement a hard lock that automatically stops the central system from providing user wait times, such as when the subscribing venue stops paying a service fee.

In one implementation, the client can be provided with an interactive dashboard (e.g., software) by the system provider. This interactive dashboard could be utilized by the client as a standalone entity or could be integrated or otherwise populated by the system provider with another interactive dashboard that the client is already utilizing. In this manner, the client could obtain the benefits of the system without disrupting their process that is already in place. In one exemplary implementation, the interactive dashboard could include an interactive floor plan of the venue. The client could then click or otherwise select on specific locations within the venue to obtain individual location analytics (as opposed to global or venue-wide analytics). In one exemplary implementation, threshold alerts could be implemented. For example only, if line attrition, wait times, or pass through traffic reach/exceed a predetermined value, the client or other staff at the venue could be notified in real-time of the threshold alert at the corresponding location(s).

Another example implementation of the system is in relation to digital signage. That is, the venue could sell its digital signage to advertisers by populating the digital signage with the system's wait times and/or other metrics (ingress/egress, pass through traffic, etc.). Such information can draw the attention of users, which is desired by the advertisers and thus can also benefit the venue by being able to sell or lease its digital signage for a higher price.

Referring now to FIG. 4, a functional block diagram of the computing system 404 is illustrated. The computing system 404 can include a communication device 500, a processor 504, and a memory 508. The communication device 500 can include any suitable components (e.g., a transceiver) configured to communicate via the network 408. The processor 504 can control operation of the computing system 404, such as performing functions including, but not limited to, loading/executing an operating system of the computing system 404, controlling communication via the communication device 500, and controlling read/write operations at the memory 508. The memory 508 can be any suitable storage medium (flash, hard disk, etc.) configured to store information at the computing system 404. The term "processor" as used herein can refer to both a single processor and a plurality of processors operating in a parallel or distributed architecture. The processor 504 can also be configured to execute at least a portion of the techniques of the present disclosure.

Referring now to FIG. 6, a flow diagram of an example technique 600 for automatic, real-time calculation of user wait times is illustrated. At 604, the computing system 404 determines whether sufficient image data has been received from the overhead camera system 200. Sufficient image data may represent overhead images over a certain period of time. If true, the technique 600 can proceed to 608. If false, the technique 600 can end or return to 604. At 608, the computing system 404 can identify a user (e.g., user 320b) of the group of users 320 that is second in the line 104 to obtain a target user. At 612, the computing system 404 can detect whether the target user becomes first in the line 104. If true, the technique 600 can proceed to 616 where the computing system 404 can obtain a start time. If false, the technique 600 can return to 612.

At 620, the computing system 404 can detect whether the target user leaves the line 104. If true, the technique 600 can proceed to 624 where the computing system 404 can obtain an end time. If false, the technique 600 can return to 620. At 628, the computing system 404 can determine a period from the start time to the end time. At 632, the computing system 404 can calculate the user wait time by calculating a product of (i) the determined period and (ii) a quantity of the group of users 320 in the line 320 after the target user leaves the line 104 (e.g., users 320c-320m). At 636, the computing system 404 can output the calculated user wait time to at least one of a plurality of suitable devices (user mobile computing devices, mobile application servers, web servers, electronic signage/billboards, data analytics servers, etc.) and the technique 600 can then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a computing system from an overhead camera system, the computing system having one or more processors, overhead images of a group of users in a line at a venue, wherein the overhead camera system includes at least one overhead fish-eye lens camera (i) mounted to a ceiling in an area above the line and (ii) configured to capture the overhead images;
wherein the overhead camera system is configured to capture the overhead images at a frame rate based on a mounting height of the ceiling to which the camera system is mounted, wherein higher mounting heights correspond to higher frame rates and lower mounting heights correspond to lower frame rates;
performing, by the computing system, edge correction on the overhead images by adjusting the edges of the overhead images to account for distortion caused by curvature of the fish-eye lens to obtain corrected overhead images;
applying, by the computing system, a set of filters to the corrected overhead images to at least obtain filtered overhead images, wherein each filter of the set of filters further distinguishes humans from noise;
generating, by the computing system, an x-y coordinate system for each of the filtered overhead images and identifying each user in the filtered overhead images as a point or a circle having a specific x-y coordinate or a specific range of x-y coordinates;
monitoring, by the computing system, the group of users using vector representations in the x-y coordinate system to obtain a user wait time for the line, the monitoring including:
(a) identifying the group of users and a user of the group of users that is second in the line to obtain a target user,
(b) detecting when the target user becomes first in the line to obtain a start time,
(c) after the target user becomes first in the line, detecting when the target user leaves the line to obtain an end time,
(d) determining a period from the start time to the end time, and (e) calculating the user wait time by calculating a product of (i) the determined period and (ii) a quantity of the group of users in the line after the target user leaves the line; and outputting, from the computing system, the calculated user wait time.

2. The computer-implemented method of claim 1, further comprising:

combining, by the computing system, two or more of the filtered overhead images to obtain a combined filtered overhead image; and monitoring, by the computing system, the group of users in the combined filtered overhead image to obtain the user wait time for the line.

3. The computer-implemented method of claim 1, further comprising ignoring or disregarding, at the computing system, a specific target user in calculating the user wait time based on a movement speed of the specific target user, wherein the specific target user is ignored or disregarded when their movement speed is greater than a speed threshold indicative of a high likelihood that the specific target user is not waiting in the line.

4. The computer-implemented method of claim 1, wherein outputting the user wait time includes outputting the user wait time to at least one of (i) a mobile computing device in response to a user request from the mobile computing device and (ii) a remote computing system associated with a mobile application executable by mobile computing devices.

5. The computer-implemented method of claim 1, wherein the line is for one of (i) an entrance to the venue, (ii) an exit from the venue, (iii) a restroom at the venue, and (iv) a concession station at the venue, and wherein the venue is one of (i) an arena or stadium for a sporting or music event, (ii) a theme or amusement park, and (iii) a business or retail location.

6. An automatic, real-time user wait time calculation system, comprising:

an overhead camera system comprising at least one overhead fish-eye lens camera (i) mounted to a ceiling in an area above the line and (ii) configured to capture overhead images of a group of users in a line at a venue; and a computing system in communication with the overhead camera system and configured to:

capture the overhead images at a frame rate based on a mounting height of the ceiling to which the camera system is mounted, wherein higher mounting heights correspond to higher frame rates and lower mounting heights correspond to lower frame rates:

perform edge correction on the overhead images by adjusting the edges of the overhead images to account for distortion caused by curvature of the fish-eye lens to obtain corrected overhead images;

apply a set of filters to the corrected overhead images to at least obtain filtered overhead images, wherein each filter of the set of filters further distinguishes humans from noise;

generate an x-y coordinate system for each of the filtered overhead images and identifying each user in the filtered overhead images as a point or a circle having a specific x-y coordinate or a specific range of x-y coordinates; and monitor the group of users using vector representations in the x-y coordinate system to obtain a user wait time for the line, the monitoring including:

(a) identify the group of users and a user of the group of users that is second in the line to obtain a target user, (b) detect when the target user becomes first in the line to obtain a start time, (c) after the target user becomes first in the line, detect when the target user leaves the line to obtain an end time, (d) determine a period from the start time to the end time, (e) calculate the user wait time by calculating a product of (i) the determined period and (ii) a quantity of the group of users in the line after the target user leaves the line, and (f) output the calculated user wait time.

7. The system of claim 6, wherein the computing system is further configured to: combine two or more of the filtered overhead images to obtain a combined filtered overhead image; and monitor the combined filtered overhead image to obtain the user wait time for the line.

8. The system of claim 6, wherein the computing system is further configured to ignore or disregard a specific target user in calculating the user wait time based on a movement speed of the specific target user, wherein the specific target user is ignored or disregarded when their movement speed is greater than a speed threshold indicative of a high likelihood that the specific target user is not waiting in the line.

9. The system of claim 6, wherein outputting the user wait time includes outputting the user wait time to at least one of (i) a mobile computing device in response to a user request from the mobile computing device and (ii) a remote computing system associated with a mobile application executable by mobile computing devices.

10. The system of claim 6, wherein the line is for one of (i) an entrance to the venue, (ii) an exit from the venue, (iii) a restroom at the venue, and (iv) a concession station at the venue, and wherein the venue is one of (i) an arena or stadium for a sporting or music event, (ii) a theme or amusement park, and (iii) a business or retail location.

11. The computer-implemented method of claim 1, wherein the computing system further trims portions of higher resolution images that are not being utilized in order to decrease processing throughput.

12. The computer-implemented method of claim 1, wherein the set of filters comprises a light filter that removes at least one of bright lights and reflective surfaces that could be inadvertently detected as humans.

13. The computer-implemented method of claim 1, wherein the set of filters comprises an edge detection filter that detects only the edges of objects and filters out other features, and wherein the detected edges are used to distinguish between humans and inanimate objects.

14. The computer-implemented method of claim 13, wherein the edge detection filter comprises both spatial and polychromatic edge filters.

15. The computer-implemented method of claim 1, wherein the set of filters comprises a debug filter that monitors a set of parameters of each user of the group of users, wherein the monitored set of parameters is used to identify the group of users.

16. The computer-implemented method of claim 15, wherein the set of parameters comprises a unique identifier, a height/weight ratio indicative of motion strength, a current motion strength, a positional/movement indicator, an age or duration that each user has been tagged, and a static weight.

17. The computer-implemented method of claim 16, wherein the debug filter further predicts each user's path of movement based on their past and current paths of movement and, based on each predicted path of movement, identify the group of users.

\* \* \* \* \*